United States Patent
Rodgers

(10) Patent No.: US 10,514,888 B1
(45) Date of Patent: Dec. 24, 2019

(54) USER-ADAPTIVE VOLUME SELECTION

(71) Applicant: Oracle International Corporation, Redwood Shores, CA (US)

(72) Inventor: Michael Patrick Rodgers, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/153,152

(22) Filed: Oct. 5, 2018

(51) Int. Cl.
 *G06F 3/16* (2006.01)
 *G10L 25/78* (2013.01)
 *H04R 29/00* (2006.01)
 *G06N 20/00* (2019.01)

(52) U.S. Cl.
 CPC .............. *G06F 3/165* (2013.01); *G06N 20/00* (2019.01); *G10L 25/78* (2013.01); *H04R 29/001* (2013.01)

(58) Field of Classification Search
 None
 See application file for complete search history.

(56) References Cited

U.S. PATENT DOCUMENTS

| | | | | |
|---|---|---|---|---|
| 5,666,426 A * | 9/1997 | Helms | ...................... | H03G 3/32 381/104 |
| 9,948,256 B1 * | 4/2018 | Dow | ........................ | H03G 3/04 |
| 2013/0173513 A1 * | 7/2013 | Chu | ........................ | G06F 9/445 706/14 |
| 2014/0372109 A1 * | 12/2014 | Iyer | ......................... | H03G 3/32 704/225 |
| 2018/0033424 A1 * | 2/2018 | Pechanec | ................ | G10L 15/22 |
| 2018/0341643 A1 * | 11/2018 | Alders | .................. | G10L 13/033 |
| 2018/0349093 A1 * | 12/2018 | McCarty | ................. | G06F 3/165 |

* cited by examiner

*Primary Examiner* — James K Mooney
(74) *Attorney, Agent, or Firm* — Invoke

(57) ABSTRACT

Techniques for user-adaptive volume selection are disclosed. A system receives audio input that includes a user request to a virtual assistant. The system determines one or more sound characteristics corresponding to the audio input, and applies the sound characteristic(s) to a volume selection model. The volume selection model selects a volume level based on the sound characteristic(s). The system plays an audio response to the user's request at the selected volume level. Subsequently, the system receives user input to modify output volume to a different volume level. Based on the user input, the system calibrates the volume selection model. When the system receives another audio input, the system analyzes the other audio input to determine one or more sound characteristics of the other audio input. The system uses the calibrated volume selection model to select a volume level for an audio response to the other audio input.

21 Claims, 8 Drawing Sheets

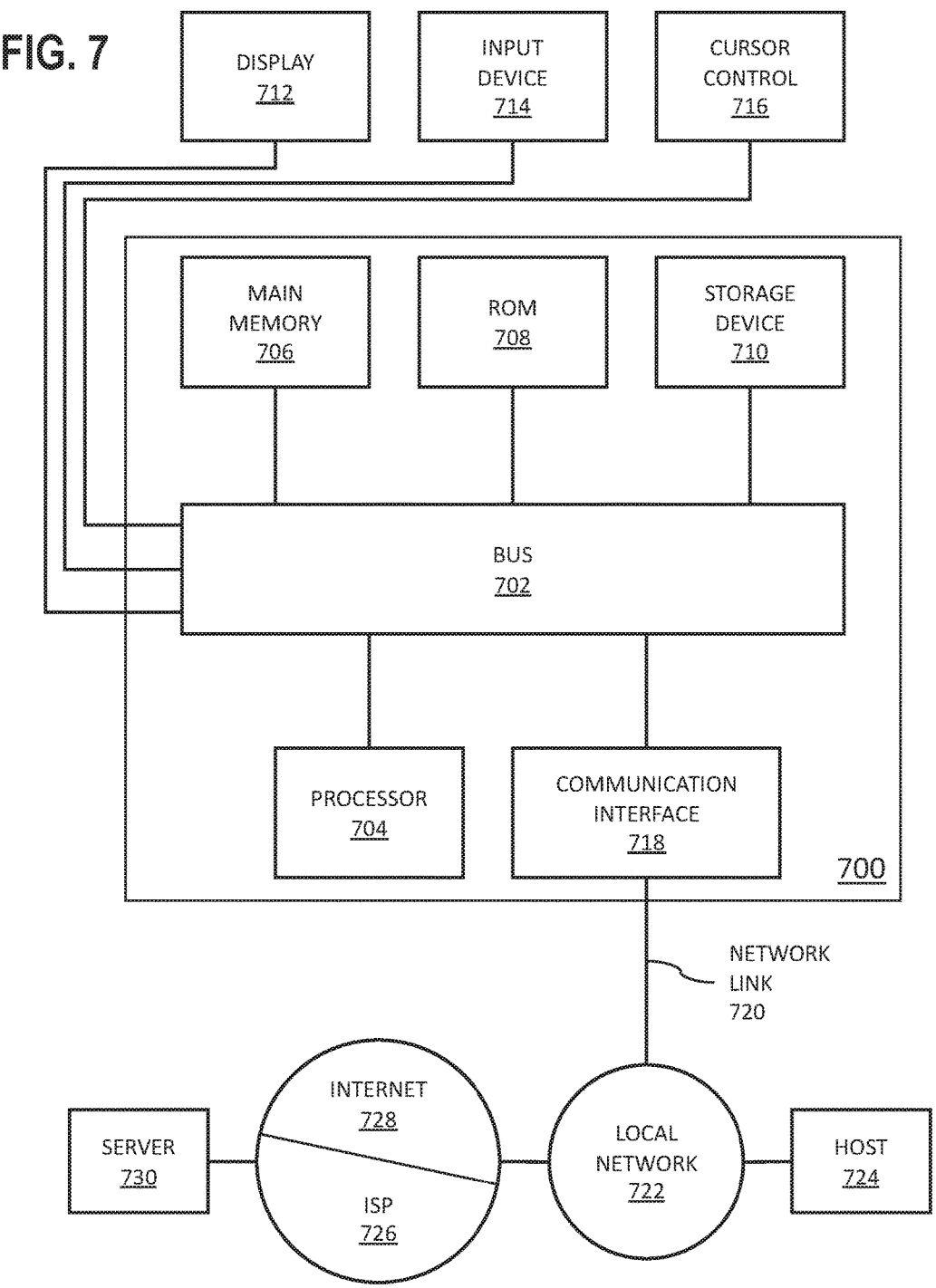

USER-ADAPTIVE VOLUME SELECTION

TECHNICAL FIELD

The present disclosure relates to audio responses. In particular, the present disclosure relates to audio response volume.

BACKGROUND

A virtual assistant is a software service that performs tasks in response to user input (e.g., voice input or text input). The user input is a request for the virtual assistant to perform a particular task. A user request may take many different forms, such as a question (e.g., "What is the weather today?"), an instruction (e.g., "Tell me the weather today"), a sentence fragment (e.g., "today's weather"), or a single word (e.g., "weather"). Typically, a virtual assistant is not limited to performing tasks using a single software application. A virtual assistant may access application programming interfaces (API's) of various software applications and/or services, in order to perform tasks based on user requests. Depending on the specific implementation, examples of tasks that a virtual assistant may perform include, but are not limited to: scheduling a reminder; checking the weather; controlling music or video playback; launching an application; checking a calendar for appointments; scheduling an appointment; placing an audio and/or video call; checking voicemail; sending a text message; dictating a received text message or email; setting a timer; checking stocks; performing unit conversions (e.g., miles to kilometers); solving math problems; controlling camera functions; enabling and/or disabling hardware features (e.g., Bluetooth or wi-fi); searching the Internet; providing directions to a location; etc.

Some virtual assistants are included with consumer hardware, such as smartphones, tablets, televisions, speakers, etc. Examples of virtual assistants included with consumer hardware include, but are not limited to: Apple Siri®; Google Assistant™; and Amazon Alexa™. Alternatively or additionally, virtual assistants may be used in other contexts, such as call-in centers or online customer support. Many different kinds of virtual assistants exist.

In some cases, when a user submits a request to a virtual assist, the virtual assistant generates an audio response to the user request. The audio response may include information that was requested by the user, an acknowledgement that a requested task was completed, a request for the user to repeat or clarify the user input, or any other kind of audio response or combination thereof. In one example, a user asks a virtual assistant, "What is the weather tomorrow?" The virtual assistant accesses a weather service to obtain information about the next day's weather. In response to the user request, the virtual assistant responds, via a speaker, "The weather tomorrow will reach sixty-four degrees with thunderstorms." In another example, a user tells a virtual assistant, "Set a timer for five minutes." The virtual assistant sets a timer for five minutes. In response to the user request, the virtual assistant responds, via a speaker, "The timer has been set." In another example, a user submits a request to a virtual assistant containing only the word "text." The virtual assistant responds, via a speaker, "To whom should I send your text message?" Based on the virtual assistant's response, the user may provide additional input, such as the name of an individual in the user's digital address book. In response to the additional input, the virtual assistant may generate an additional audio response. A virtual assistant may provide many different kinds of audio responses to many different kinds of user requests.

When a virtual assistant provides an audio response to a user request, the response may be too quiet or too loud, i.e., the volume level of the response may be too low or too high for the context in which the response is provided. The volume level of the virtual assistant's response may be a last-used volume. For example, a user may have set the volume to a level that is appropriate for a ringtone volume, media playback, or some other use. A user-set volume level that is appropriate for one use may not also be appropriate for a virtual assistant's response. Alternatively or additionally, the last-used volume may have been set in a different environmental context. A user-set volume level that is appropriate for one context may not also be appropriate for another context. In one example, a user submits a request to a virtual assistant while walking along a busy street. The virtual assistant's response is too quiet and the user is unable to discern the response. In another example, a user submits a request to a virtual assistant while putting a baby to bed. The virtual assistant's response is too loud and wakes the baby. Many different situations exist in which a virtual assistant's response may be too quiet or too loud for the context in which the response is provided. In general, a virtual assistant's response that is too quiet may be indiscernible, and a virtual assistant's response that is too loud may be disruptive.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1. VOLUME SELECTION MODEL
2.2. TRAINING SYSTEM
3. USER-ADAPTIVE VOLUME SELECTION
4. ILLUSTRATIVE EXAMPLE
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include calibrating a volume selection model for a virtual assistant. A volume selection model selects an initial volume level for the virtual assistant to play a response to a request. However, subsequent to or during the playing of a response, user input specifies a new volume level. Based on the user input, the volume selection model is calibrated such that when a future request is received with substantially similar characteristics as the prior request, the volume selection model selects, for a response, a volume level that is substantially similar to the new volume level specified by the user input. Request characteristics may include non-sound characteristics (for example, a time of the request, ambient light, a kind of audio device used, and/or any other kind of non-sound characteristic). Request characteristics may include sound characteristics (for example, a whispered request, echoes indicating a distance of the user from the microphone, a request received with background noise that yields a low signal-to-noise ratio, a request received with background noise that yields a high signal-to-noise ratio, and/or any other kind of sound characteristic).

One or more embodiments described in this Specification and/or recited in the claims may not be included in this General Overview section.

2. Architectural Overview

Figure 1:
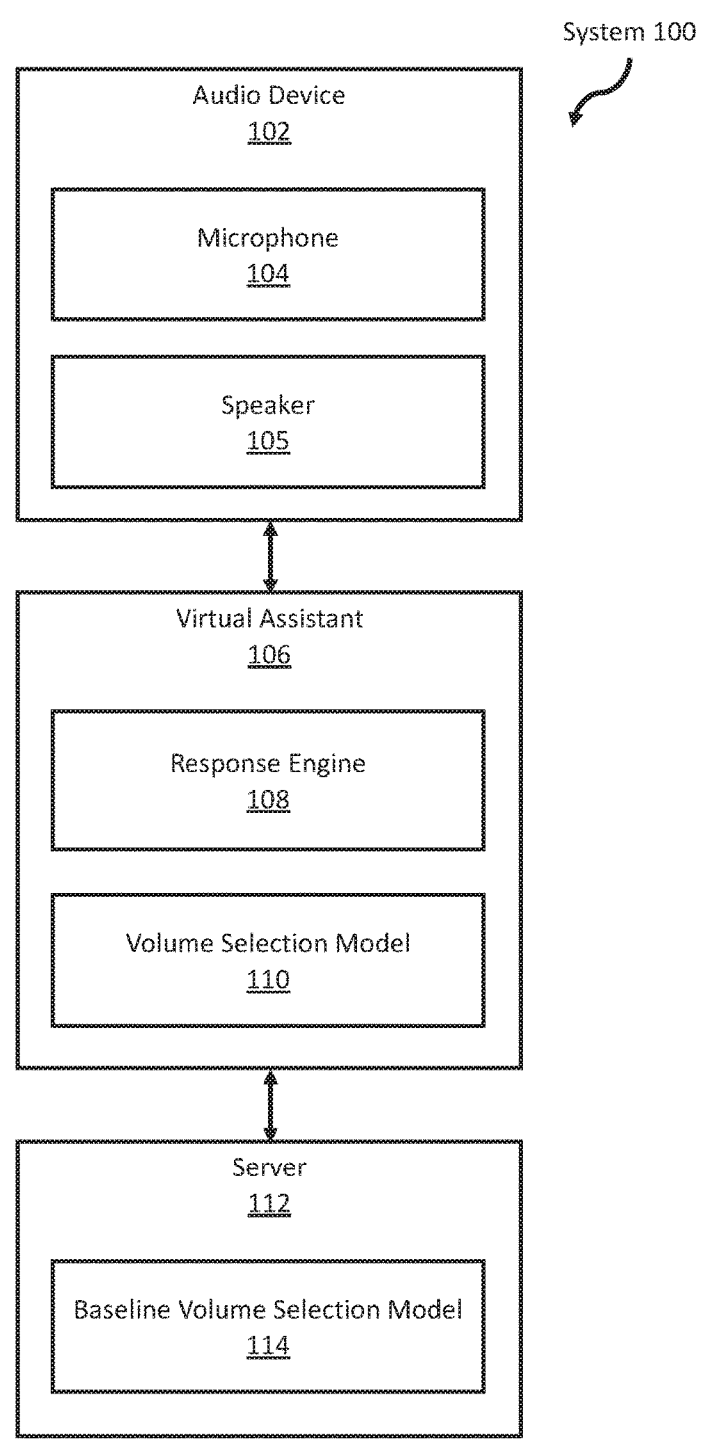
FIG. 1 illustrates a system in accordance with an embodiment.

FIG. 1 illustrates a system 100 in accordance with one or more embodiments. As illustrated in FIG. 1, system 100 includes an audio device 102, a virtual assistant 106, a server 112, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the system 100 includes an audio device 102. The audio device 102 may be any kind of device that is configured to receive audio input and/or output audio. The audio device 102 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, an audio device 102 includes a microphone 104 through which a user supplies audio input, such as a request to a virtual assistant 106. Alternatively or additionally, the audio device 102 may include a speaker 105 through which the audio device outputs audio, such as an audio response generated by a virtual assistant 106. Audio input and output functionality may be distributed across multiple audio devices. The system 100 may receive audio input via a microphone in one audio device and output an audio response via a speaker in another audio device.

In an embodiment, the system 100 includes a virtual assistant 106. The virtual assistant 106 may include any kind of hardware and/or software that is configured to receive user input (e.g., audio input and/or text input) and perform tasks based on the user input. In an embodiment, the virtual assistant 106 includes a response engine 108 that is configured to generate a response to a user request. To generate a response to a user request, the response engine 108 may access one or more API's of one or more software applications and/or services (not shown). In an embodiment, the virtual assistant 106 includes hardware and/or software configured to perform operations described herein for user-adaptive volume selection. Examples of operations for user-adaptive volume selection are described below.

In an embodiment, the virtual assistant 106 is configured to perform user-adaptive volume selection using a volume selection model 110. An example of a volume selection model 110 is described below. The virtual assistant 106 may include a single volume selection model 110 used to perform user-adaptive volume selection for a single user. Alternatively or additionally, the virtual assistant 106 may include a single volume selection model 110 used to perform user-adaptive volume selection for multiple users (i.e., multiple users of a single audio device 102 or multiple users of different audio devices). Alternatively or additionally, the virtual assistant 106 may include multiple volume selection models 110, each associated with one or more different user(s). The virtual assistant 106 may be able to distinguish between different users and may use a different volume selection model depending on which user is detected. Alternatively or additionally, the virtual assistant 106 may be able to distinguish between different languages and may use a different volume selection model depending on which language is detected. Many different configurations of one or more volume selection model(s) may be used, based on many different criteria.

In an embodiment, the system 100 includes a server 112. The server 112 may include hardware and/or software to communicate with multiple virtual assistants (not shown). The server 112 may include a baseline volume selection model 114 that represents a baseline or out-of-the-box' configuration of a volume selection model. The server 112 may be configured to transmit the baseline volume selection model 114 to a virtual assistant 106, to be used as an initial state of the volume selection model 110. Alternatively or additionally, the server 112 may be configured to receive calibration data, associated with the volume selection model 110, from the virtual assistant 106. The server 112 may be configured to incorporate the calibration data into the baseline volume selection model 114.

In an embodiment, the audio device 102 includes all of the virtual assistant 106's functionality. The audio device 102 may be a smartphone, smart speaker, or other device that includes a microphone 104, a speaker 105, and hardware and/or software that implements all of the virtual assistant 106's functionality. Alternatively, the audio device 102 may include hardware and/or software that implements only a subset of the virtual assistant 106's functionality. For example, a virtual assistant 106 operating in an audio device 106 may be configured to transmit a user's input to a server 112 for natural language processing. Based on the natural language processing, the server 112 may be configured to return data to the virtual assistant 106. The data returned by the server 112 to the virtual assistant 106 may include a normalized form of the user input, programmatic instructions to perform a particular task, and/or content (e.g., text and/or audio content) corresponding to a response to provide to the user. The virtual machine 106 operating within the audio device 102 may be configured to perform the requested task and/or supply a response to the user, based on the data returned by the server.

In an embodiment, the virtual machine 106 operates in a separate device than the audio device 102. In one example, a smartphone includes some or all of the virtual machine 106's functionality. The audio device 102 is a headset (e.g., a wired headset or Bluetooth® headset) that includes a microphone 104 and speaker 105. The headset is communicatively coupled with the smartphone. A user supplies audio input to the smartphone via the headset, and receives an audio response from the smartphone via the headset. In another example, a server 112 includes all of the virtual machine 106's functionality. In this example, an audio device 102 transmits user input to the virtual assistant 106 operating at the server 112. Based on the user input, the virtual assistant 106 may perform a task. The virtual assistant 106 generates a response that the server 112 transmits back to the audio device 102.

Various configurations of an audio device 102, virtual assistant 106, and server 112 are described above. These configurations are described by way of example only and should not be construed as limiting one or more embodiments.

2.1. Volume Selection Model

Figure 2:
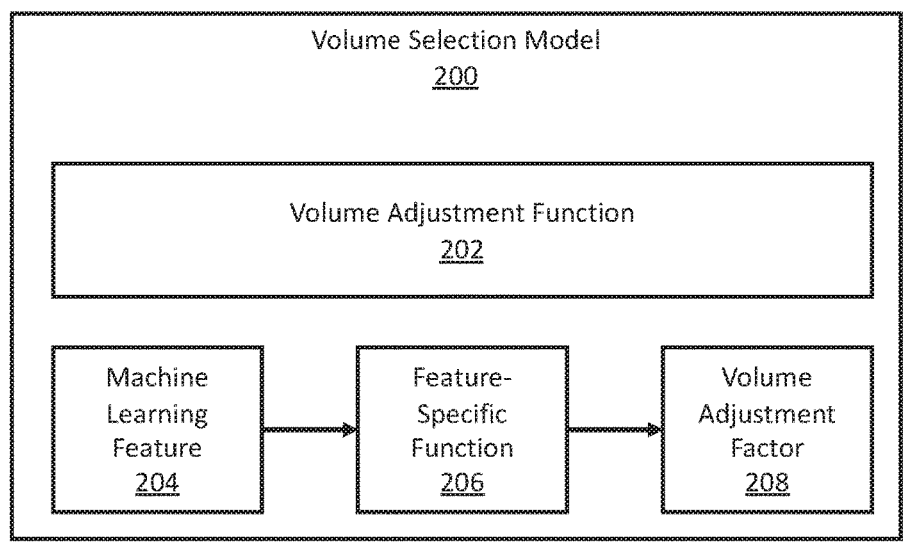
FIG. 2 illustrates a volume selection model in accordance with an embodiment.

As discussed above, a virtual assistant may include a volume selection model. FIG. 2 illustrates a volume selection model 200 in accordance with an embodiment. In one or more embodiments, a volume selection model 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

The volume selection model 200 is set of hardware and/or software configured to receive one or more inputs and apply the input(s) to a volume selection function 202. Based on the input(s), the volume selection function 202 outputs a selected volume.

In an embodiment, the volume adjustment function 202 is based on one or more machine learning features 204. A machine learning feature 204 is a measurable property that determines, in whole or in part, the output of the volume selection function 202. In an embodiment, for each machine learning feature 204, the volume selection model 200 includes a corresponding feature-specific function 206 that computes a volume adjustment factor 208. The volume adjustment function 202 may be a linear function based on the volume adjustment factor(s) 208 computed for each machine learning feature 204. In one example, the volume selection model 200 include two machine learning features: Feature A and Feature B. Based on inputs to the volume selection model 200, the volume selection model 200 computes a volume adjustment factor (F1) for Feature A and a volume adjustment factor (F2) for Feature B. The volume adjustment function 202 is a linear function that selects a volume (V) as a function of an audio device's current volume (C) and the two volume adjustments factors (F1 and F2). The following is an example of a linear volume selection function:

$$V = C \times (F1 + F2)/2$$

Many different kinds of linear and/or non-linear volume selection functions may be used. Continuing with the example, the volume selection model 200 determines that the current volume is eighty percent (80%). Based on inputs to the volume selection model 200, the volume selection model 200 computes F1 as 0.5 and F2 as 1.3. Applying those values to the volume adjustment function 202 yields:

$$V = 0.8 \times (0.5 + 1.3)/2 = 0.72$$

In this example, the volume selection model 200 would select a volume of 72%, which is lower than the current volume of 80%.

As noted above, the volume adjustment function 202 may be based on one or more machine learning features 204. Many different kinds of machine learning features 204 may be used. In an embodiment, a machine learning feature 204 is based on loudness of a voice detected in audio input. A system may be configured to detect whether a user is whispering, yelling, or speaking at a conversational volume. Detecting the loudness of a voice may be based on objective loudness (e.g., wave amplitude), image recognition (e.g., detecting proximity of the user's face and/or body to a camera in the audio device, or a user's absence from a room where the audio device is located), characteristics of speech (e.g., wave characteristics associated with whispering versus yelling), or any other measurement of loudness or combination thereof. The system may use machine learning to improve, over time, its ability to determine the loudness of a user's voice. If a user's voice is loud, the corresponding feature-specific function 206 may compute a volume adjustment factor 208 that raises the volume of the virtual assistant's audio response. If the user's voice is quiet, the corresponding feature-specific function 206 may compute a volume adjustment factor 208 that decreases the volume of the virtual assistant's audio response.

In an embodiment, a machine learning feature 204 is based on a distance of an audio device from a user who supplies audio input to the audio device. The distance may be an estimate based on one or more measured properties. In one example, a system determines that a user's voice has properties that are associated with yelling. The system also determines that the audio input has a relatively low amplitude. Based on these properties, the system estimates that the user is far away (e.g., yelling a request to the audio device from another room). In another example, a system determines that a user's voice has properties that are associated with yelling. The system also determines that the audio input has relatively high amplitude. Based on these properties, the system estimates that the user is nearby (e.g., yelling directly into the audio device). In another example, a system determines that a user's voice has properties that are associated with whispering. The system also determines that the audio input has a moderate amplitude. Based on these properties, the system estimates that the user is nearby (e.g., whispering directly into the audio device). In another example, a system determines that a user's voice has properties that are associated with whispering. The system also determines that the audio input has a relatively low amplitude. Based on these properties, the system estimates that the user is not immediately next to the audio device (e.g., whispering from across a room). In another example, a system analyzes leading and trailing echoes in the audio input. Based on the leading and trailing echoes, the system estimates how far the user is from the audio device. In one example, in a space without excessive reflecting sound, the loudness of omnidirectional sound is inversely proportional to the square of the distance from the source. The system may apply the inverse-square law to estimate how far the user is from the audio device. If a user is far from the audio device, the corresponding feature-specific function 206 may compute a volume adjustment factor 208 that raises the volume of the virtual assistant's audio response. If the user is close to the audio device, the corresponding feature-specific function 206 may compute a volume adjustment factor 208 that decreases the volume of the virtual assistant's audio response.

In an embodiment, a machine learning feature 204 is based on ambient volume level. In one example, a system analyzes the audio input and separates it into two waveforms corresponding to signal (i.e., the user's voice) and noise (i.e., other noise in the audio input that is not the user's voice). The system determines a signal-to-noise ratio (SNR) between the user's voice and the other noise in the audio input. A low SNR may indicate that the user is speaking in a noisy environment. The corresponding feature-specific function 206 may compute a volume adjustment factor 208 that raises the volume of the virtual assistant's audio response. A high SNR may indicate that the user is speaking in a quiet environment. The corresponding feature-specific function 206 may compute a volume adjustment factor 208 that uses a normal volume or decreases the volume of the virtual assistant's audio response. In another example, a system performs ambient noise monitoring even when a user is not providing audio input. The system may capture and store a running ambient noise sample (e.g., the most recent ten seconds). Alternatively or in addition, the system may calculate an average or peak waveform of the ambient noise. The system may perform ambient noise monitoring in multiple locations (e.g., multiple rooms in a building) and may be able to distinguish between the ambient noise where the user is located versus where the audio device is located. When a user provides audio input, the system may compare the results of ambient noise monitoring with the loudness of the user's voice and use the corresponding feature-specific function 206 to compute an appropriate volume adjustment factor 208.

In an embodiment, the system is able to recognize ambient audio (e.g., music, a podcast, news, or any other kind of ambient audio) that is coming from the audio device itself. When determining the amount of ambient noise, the system may discount for the ambient audio coming from the audio device itself. The audio device may decrease its own ambient audio (e.g., pause a podcast or decrease music volume) when outputting a virtual assistant's audio response.

In an embodiment, a machine learning feature 204 is based on a kind of audio device that receives audio input and/or a kind of audio device that is configured to output a virtual assistant's audio response. In one example, a system determines that a user is yelling. The system also determines that the user is wearing an audio headset. Based on the fact that the user is wearing an audio headset, the corresponding feature-specific function 206 may compute a volume adjustment factor 208 that keeps the volume at a normal level or increases the volume less than if the user were yelling to a speaker across a room.

In an embodiment, a machine learning feature 204 is based on linguistic content of the audio input. Certain words or combinations of words may cause the corresponding feature-specific function 206 to compute a volume adjustment factor 208 that increases or decreases the volume of the virtual assistant's audio response. In one example, a virtual assistant has multiple 'personas' that may be invoked in different circumstances. The 'personas' may correspond to 'wake words' used to signal a virtual assistant that a user is submitting a request. In this example, one persona is named 'Stan' and is invoked in normal circumstances. Another persona is named 'Nanny' and is invoked when a baby is sleeping. When a user submits a request to the 'Stan' persona (e.g., by asking, "Stan, what time is it?"), the corresponding feature-specific function 206 computes a volume adjustment factor 208 that does not alter the volume of the virtual assistant's audio response. When a user submits a request to the 'Nanny' persona, the corresponding feature-specific function 206 computes a volume adjustment factor 208 that decreases the volume of the virtual assistant's audio response.

Alternatively or additionally, the machine learning feature 204 may be based on a sentiment expressed in the linguistic content of the audio input. A brief and/or curt request (e.g., "Tell me the weather") may warrant a louder response than a longer and/or gentler request (e.g., "Please tell me what the weather will look like today"). In general, based on a sentiment expressed in the linguistic content of the audio input, the corresponding feature-specific function 206 may computes a volume adjustment factor 208 that increases or decreases the volume of the virtual assistant's audio response.

Alternatively or additionally, a keyword in a user's request may serve as a basis for increasing or decreasing the volume of the virtual assistant's audio response. For example, a user may say, "Quietly tell me the weather," or "Loudly tell me what time it is." Alternatively or additionally, a phrase in a user's request may serve as a trigger to increase or decrease the volume of the virtual assistant's audio response. For example, a user may say, "Play the song 'Baby Beluga' for the baby." Based on the phrase, "for the baby," the corresponding feature-specific function 206 may compute a volume adjustment factor 208 that decreases the volume of the virtual assistant's audio response. Many different kinds of linguistic content in a user's request basis for increasing or decreasing the volume of a virtual assistant's audio response.

In an embodiment, a machine learning feature 204 is based on a time of day when the user submits a request to a virtual assistant. During typical waking hours, the corresponding feature-specific function 206 may compute a volume adjustment factor 208 that does not change the volume of the virtual assistant's audio response. During typical sleeping hours, the corresponding feature-specific function 206 may compute a volume adjustment factor 208 that decreases the volume of the virtual assistant's audio response.

In an embodiment, a machine learning feature 204 is based on ambient light. A system may include a light sensor or another hardware element, such as a camera, that can be used to obtain a light-level reading. Based on the light sensor, the system may determine whether an audio device is located in a dark environment or a bright environment. If the audio device is located in a dark environment (suggesting nighttime and/or a darkened room), the corresponding feature-specific function 206 may compute a volume adjustment factor 208 that decreases the volume of the virtual assistant's audio response. If the audio device is located in a bright environment (suggesting daytime and/or a well-lit room), the corresponding feature-specific function 206 may compute a volume adjustment factor 208 that does not change the volume of the virtual assistant's audio response. If the audio device is located in an environment with flashing and/or colorful lights (suggesting a bar or nightclub), the corresponding feature-specific function 206 may compute a volume adjustment factor 208 that increases the volume of the virtual assistant's audio response.

In an embodiment, a machine learning feature 204 is based on a location of the user. A system may include a global positioning system (GPS) unit and/or other positioning technology. Using the positioning technology, the system may determine the user's physical location. In addition, the system may correlate the user's physical location with known locations on a map, such as restaurants, stores, museums, residences, etc. Based on the known location, the corresponding feature-specific function 206 may compute a volume adjustment factor 208 that increases or decreases the volume of the virtual assistant's audio response. As one example, a user submits a request to a virtual assistant. Using GPS positioning correlated with business location data, the system determines that the user is located at a restaurant. Based on the user's location, the corresponding feature-specific function 206 computes a volume adjustment factor 208 that decreases the volume of the virtual assistant's audio response. As another example, a user submits a request to a virtual assistant. Using GPS positioning correlated with business location data, the system determines that the user is located at a football stadium. Based on the user's location, the corresponding feature-specific function 206 computes a volume adjustment factor 208 that increases the volume of the virtual assistant's audio response.

In an embodiment, a machine learning feature 204 is based on an identity of a user who submits a request to a virtual assistant. A system may determine the user's identity based on facial recognition (via a camera), voice recognition, fingerprint recognition, and/or any other kind of system capable of distinguishing between different users. As discussed above, a virtual assistant may include a single volume selection model 200 used to perform user-adaptive volume selection for multiple users (i.e., multiple users of a single audio device or multiple users of different audio devices). Alternatively or additionally, the virtual assistant may include multiple volume selection models 200, each associated with one or more different user(s). As discussed below, each user may be able to configure different volume preferences associated with machine learning features 204. Alternatively or additionally, the volume selection model 200 may use machine learning to adapt a feature-specific function 206 to a particular user.

In an embodiment, a machine learning feature 204 is based on a characteristic of a user's speech, as detected in the audio input. As one example, a user with a hearing impairment submits a request to a virtual assistant. A system analyzes the audio input and determines that the user's speech has one or more characteristics typically associated with a hearing impairment. Based on the results of the analysis, the corresponding feature-specific function 206 computes a volume adjustment factor 208 that increases the volume of the virtual assistant's audio response.

In an embodiment, a machine learning feature 204 is based on an audio device's current volume level. When a volume adjustment function 202 outputs a selected volume, the selected volume may correspond to an amplitude of a waveform that encodes the virtual assistant's audio response. The amplitude of the waveform may be independent of the audio device's master volume setting. In this situation, if the waveform amplitude is high and the audio device's master volume is already high, the virtual assistant's audio response may be even louder than intended. If the waveform amplitude is low and the audio device's master volume is already low, the virtual assistant's audio response may be even quieter than intended. To account for variations in the audio device's master volume, the system may detect the audio device's master volume. The corresponding feature-specific function 206 may compute a volume adjustment factor 208 that increases or decreases the volume of the virtual assistant's audio response. Alternatively, when the volume adjustment function 202 outputs a selected volume, the system may use the selected volume to directly control the audio device's master volume.

In an embodiment, a machine learning feature 204 is based on audio input received from audio sensors in multiple locations (e.g., multiple rooms in a building). In one example, a system includes multiple Bluetooth® beacons configured to receive audio in multiple locations. Using multiple audio sensors may improve a system's ability to detect ambient noise, estimate a user's distance from a speaker, etc.

In an embodiment, a machine learning feature 204 is configurable by a user. Specifically, a user may access an interface (not shown) that provides one or more user interface controls for configuring one or more machine learning features 204. The control(s) may allow the user to indicate, for specific a specific value or range of values associated with a machine learning feature 204, whether a virtual assistant's audio response volume should increase or decrease. As one example, the volume selection model 200 includes a machine learning feature 204 based on time of day. A user who has a young child may indicate, via the configuration interface, that the virtual assistant's response volume should be decreased between 10:00 p.m. and 6:00 a.m. Another user who works a night shift may indicate, via the configuration interface, that the virtual assistant's response volume should be decreased (perhaps even silenced) from 12:00 p.m. to 8:00 p.m. A configuration interface may supply many different configuration options.

2.2. Training System

In an embodiment, a system is configured to train a volume selection model based on training data and/or live data, using machine learning techniques. As used herein, training the volume selection model means configuring the volume selection model to select a particular volume based on one or more particular inputs. To train the volume selection model, a training system may adjust a feature-specific function, so that the feature-specific function outputs a different volume adjustment factor than it would have outputted prior to the training.

Figure 3:
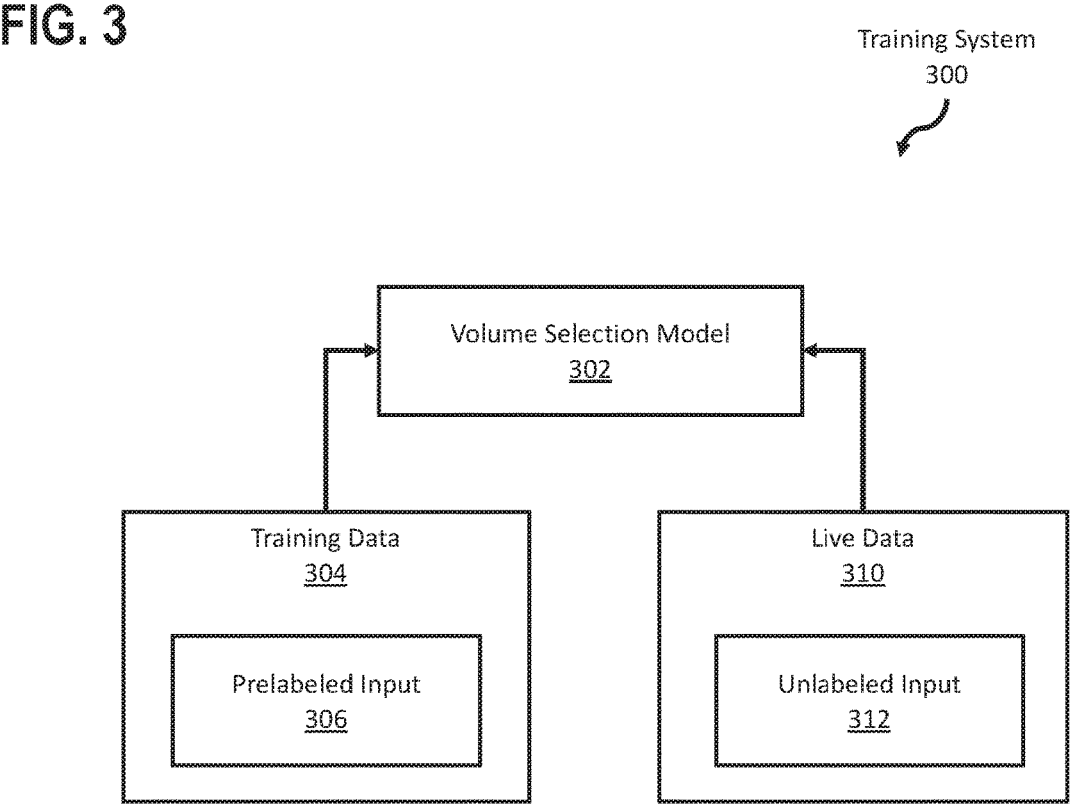
FIG. 3 illustrates a training system in accordance with an embodiment.

FIG. 3 illustrates a training system 300 in accordance with one or more embodiments. In one or more embodiments, a training system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the volume selection model 302 has an initial state, prior to any configuration. Beginning with the initial state, the training system 300 may train the volume selection model 302 based on training data 304. The training data 304 includes one or more sets of prelabeled input 306. The prelabeled input 306 may include audio files and/or any other kind of input relating to a machine learning feature (not shown) included in the volume selection model 302. As used herein, the term "prelabeled" means that the training data 304 includes data that, for each prelabeled input 306, defines an output (i.e., volume selection of the volume selection model 202) corresponding to the provided audio and/or other kind(s) of input. The training system 300 may apply supervised learning techniques to train the volume selection model 302, based on the training data 304. In an embodiment, supervised learning trains the volume selection model so that, given values of machine learning features that are identical or substantially similar to values in the training data 304, the volume selection model 302 selects a volume level that is considered 'correct' according to the labels associated with the training data 304. In one example, the training system 300 uses a linear regression model to train the volume selection model 302. Once the training system 300 has trained the volume selection model 302 based on training data 304, a virtual assistant may use the resulting volume selection model 302 as an initial, 'out-of-the-box' configuration.

In an embodiment, after the volume selection model 302 is deployed to a virtual assistant in a 'live' environment, the training system 300 continues to train the volume selection model 302 using live data 310. The live data 310 includes one or more sets of unlabeled input 312. The unlabeled input 312 may include audio files and/or any other kind of input relevant to a machine learning feature (not shown) included in the volume selection model 302. As used herein, the term 'live' means that the live data 310 includes data associated with requests made by one or more end users. A 'live' environment may also be referred to as a 'production' environment. As used herein, the term "unlabeled" means that the training data 304 does not include any data that, for the unlabeled input 312, defines an output (i.e., volume selection of the volume selection model 202) corresponding to the provided audio and/or other kind(s) of input. The training system 300 may apply machine learning techniques to train the volume selection model 302, based on the live data 310. In an embodiment, the training system 300 may apply machine learning techniques based on user input (e.g., volume adjustments and/or other kinds of user input) and/or lack of user input received after an audio device plays back a virtual assistant's audio response, to support user-adaptive volume selection as described herein.

3. User-Adaptive Volume Selection

Figure 4:
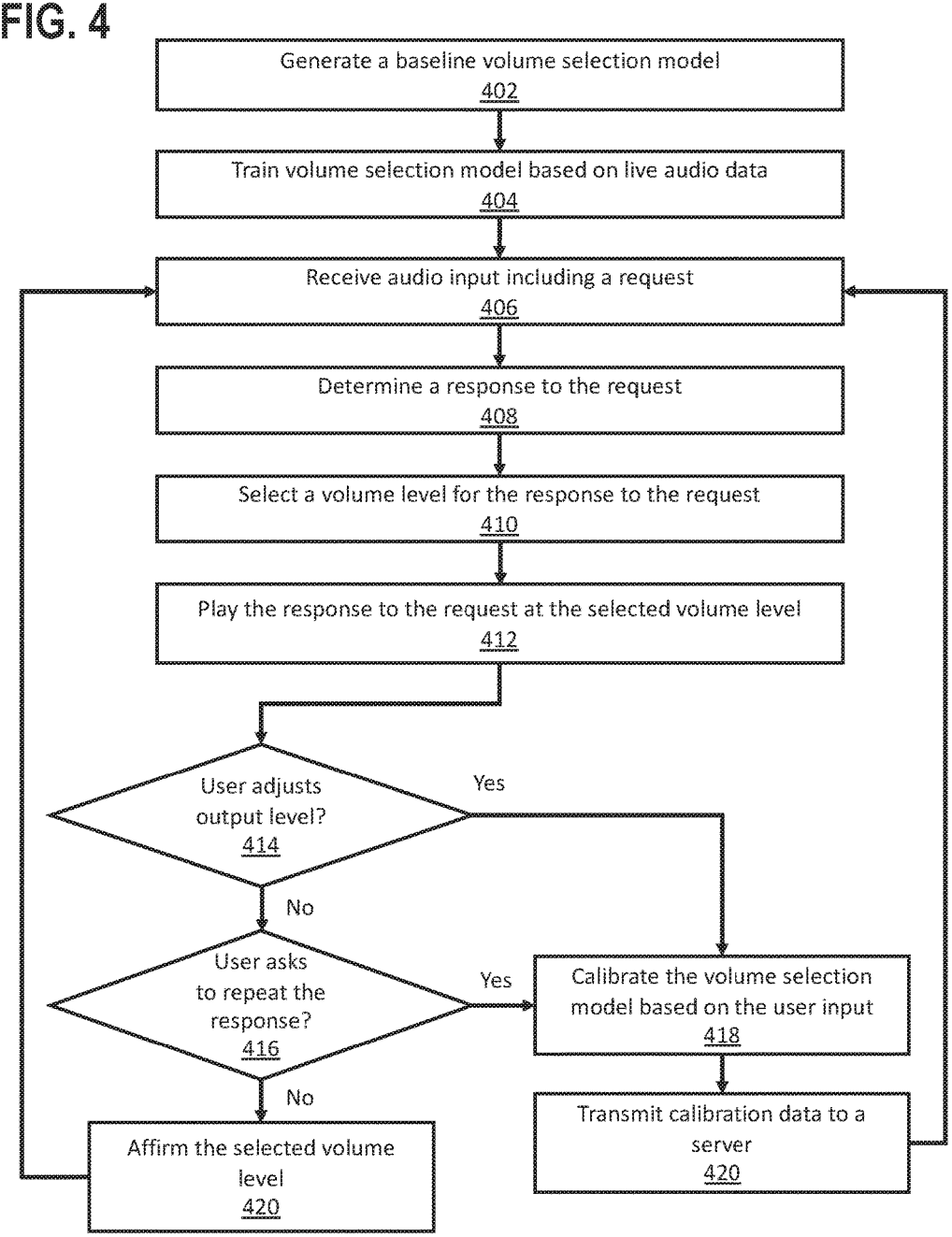
FIG. 4 illustrates a set of operations for user-adaptive volume selection in accordance with an embodiment.

FIG. 4 illustrates an example set of operations for user-adaptive volume selection in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a system generates a baseline volume selection model (Operation 402). The baseline volume selection model represents an initial state of the volume selection model. In an embodiment, baseline volume selection model is obtained by training a volume selection model, using training data, as described above.

In an embodiment, the system trains the volume selection model based on live audio data (Operation 404). To train the volume selection model based on live audio, the system may enter into a training or 'tutorial' mode, in which a user is asked to provide audio input that satisfies certain criteria. As one example, a virtual assistant in a smartphone includes a training mode, for training a volume selection model. The virtual assistant issues a series of prompts for a user to provide audio input into a microphone. One prompt asks the user to speak in normal voice. Another prompt asks the user to whisper. Another prompt asks the user to yell. Based on each audio input supplied by the user, the virtual assistant trains the volume selection model to better recognize different levels of voice loudness for that particular user. Alternatively or additionally, the virtual assistant may generate a series of audio outputs and prompt the user to indicate whether each audio output is too loud or too quiet. Based on the user's responses, the virtual assistant trains the volume selection model to select appropriate volume levels for audio responses. A system may use many different kinds of training approaches in connection with many different machine learning features.

In an embodiment, the system receives audio input (Operation 406) that includes a request, by a user, for the virtual assistant to perform a task. The system determines a response to the request (Operation 408). To determine a response to the request, the system may access one or more API's of one or more applications and/or services corresponding to the request. As one example, the request is for a weather report. The system accesses a weather service's API to obtain weather data responsive to the request. In addition to audio input, the system may receive other data associated with one or more machine learning features. For example, the system may receive data from a light sensor, a time service, ambient volume monitoring, and/or any other kind of data related to one or more machine learning features.

In an embodiment, the system selects a volume level for the response to the request (Operation 410). The system may use a volume selection model to select the volume level for the request. Using a volume selection model to select a volume level is discussed in further detail below. As discussed above, the selected volume may correspond to an amplitude of a waveform that encodes the virtual assistant's audio response. The amplitude of the waveform may be independent of the audio device's master volume setting. In this situation, if the waveform amplitude is high and the audio device's master volume is already high, the virtual assistant's audio response may be even louder than intended. If the waveform amplitude is low and the audio device's master volume is already low, the virtual assistant's audio response may be even quieter than intended. Alternatively, when the volume adjustment function 202 outputs a selected volume, the system may use the selected volume to directly control the audio device's master volume. After selecting a volume level for the response to the request, the system plays the response to the request at the selected volume level (Operation 412).

In an embodiment, the system selects a volume level and plays back the response to the request after a significant amount of time has passed since receiving the user request. In one example, a user submits a request to set a timer. When the timer is complete, the system plays an audio response indicating that the timer is complete. Due to the passage of time, the system may resample data relevant to one or more machine learning features. The system may select a volume level for the response based on data that is more proximate in time to the response. For example, if the user is no longer in the room, the system may select a louder response volume than it would have selected when the user was still in the room. If ambient noise has decreased in the time since the user submitted the request, the system may select a quieter response volume than it would have selected when the ambient noise was louder. The values of many different machine learning features may differ in the time between a user request and the virtual machine's audio response, and a change in one or more of the value(s) may affect the selected volume level.

In an embodiment, after playing the response to the request at the selected volume level, the system determines whether the selected volume level was acceptable to the user. The system may determine whether the selected volume level was acceptable to the user in many different ways. In an embodiment, the system determines whether the user has adjusted the audio device's output level (Operation 414). Specifically, after the system plays back the response to the request at the selected volume level, the user may increase or decrease the audio device's output level. Increasing or decreasing the audio device's output level may indicate that the selected volume was too quiet (causing the user to increase the output level) or too loud (causing the user to decrease the output level). The determination of whether the user has adjusted the audio device's output level may be limited to a particular amount of time (e.g., three seconds or some other predefined threshold amount of time) following playback of the virtual assistant's response to the request. If the user increases or decreases the audio device's output level beyond the threshold period of time, the adjustment may no longer be considered a reaction to the selected volume level.

In an embodiment, if the user adjusts the audio device's output level, then the system calibrates the volume selection model based on the user input (Operation 418), i.e., the input by which the user adjusted the output level. Calibrating the volume selection model may adjust one or more feature-specific function(s) so that, given the same value(s) for the same machine learning feature(s) in the future, the volume selection model will select either a higher volume (if the user increased the output level) or a lower volume (if the user decreased the output level).

In an embodiment, the system determines whether the user asks to repeat the response to the user's request (Operation 416). The user may explicitly ask the virtual assistant to repeat the same response, reissue the same query to the virtual assistant, issue a differently-worded but substantially similar query to the virtual assistant, and/or provide any other kind of input amounting to a request to provide another response that is identical or substantially similar. Asking to repeat the response may indicate that the selected volume level was too quiet. If the user asks to repeat the response, the system may calibrate the volume selection model based on the user input (Operation 418), i.e., the audio input asking to repeat the response. Specifically, the system may use machine learning techniques (e.g. linear regression and/or another kind of machine learning technique) to calibrate the volume selection model. Calibrating the volume selection model may adjust one or more feature-specific function(s) so that, given the same value(s) for the same machine learning feature(s) in the future, the volume selection model will select a lower volume.

In an embodiment, after calibrating the volume selection model based on user input, the system transmits calibration data to a server (Operation 420). The server may use the calibration data to calibrate a baseline volume selection model, thereby incorporating machine learning from one or more live volume selection models into the baseline volume selection model. The server may then provide the baseline volume selection model to other virtual assistants, providing the other virtual assistant(s) with a more accurate volume selection model 'out-of-the-box.' In an embodiment, the system transmits calibration data to the server only if a user has opted into a sharing program, i.e., provides informed consent for the system to transmit the calibration data to the server.

In an embodiment, the user does not adjust the output level, does not ask to repeat the response, and/or does not give any other indication that the selected volume level was too quiet or too loud. When enough time has passed (e.g., three seconds or some other predefined threshold amount of time) without any indication that the selected volume level was too quiet or too loud, the system may affirm the selected volume level (Operation 420). The system may affirm the selected volume level after receiving a predefined number of user queries (e.g., two, three, four, or any other predefined number), associated with substantially similar sets of values of machine learning features, without the user adjusting the output level. In an embodiment, to affirm the selected volume level, the system incorporates into the volume selection model a confidence metric, indicating an increased confidence that the selected volume level is correct for the associated values of machine learning features. The system may incorporate the confidence metric into the volume selection model in many different ways. For example, the system may incorporate the confidence metric as a new machine learning feature, a higher numeric weight associated with a particular machine learning feature and/or data point (e.g., a data point corresponding to the selected volume), and/or any other kind of confidence metric or combination thereof. The system may use a machine learning technique to incorporate the confidence metric into the volume selection model. After affirming the selected volume level, given the same value(s) for the same machine learning feature(s) in the future, the volume selection model is more likely to select the same volume as before.

In an embodiment, the system subsequently receives additional audio input (Operation 406) that includes a user request for the virtual assistant to perform a task. The system may receive the audio input under similar circumstances (e.g., ambient volume, time of day, loudness of the user's voice, etc.) as the previous audio input or under different circumstances. The system proceeds, as described above, to determine a response to the request, select a volume level for the response, etc. If the system calibrated the volume selection model based on earlier audio input, the system may select a different volume level for this response than it would have selected in the absence of the calibration. In this manner, the subsequent response may have a more appropriate volume level, based on the earlier machine learning process.

Figure 5:
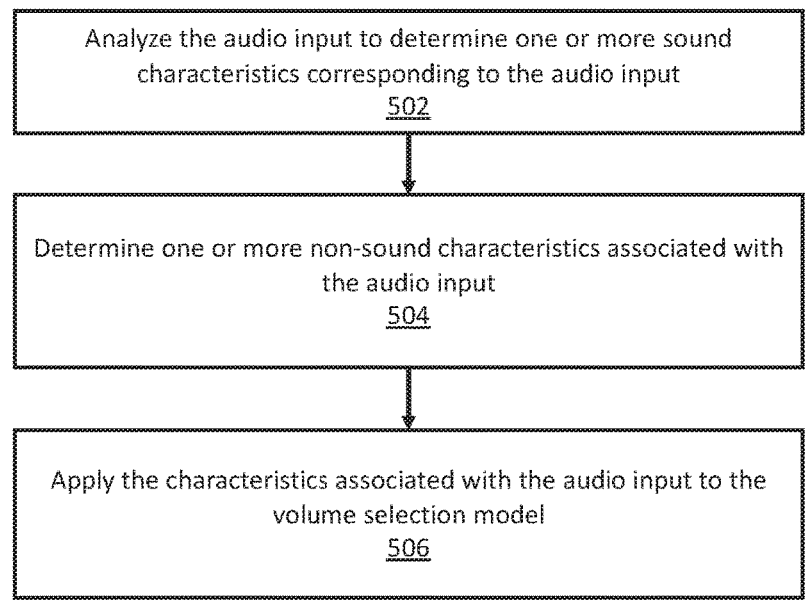
FIG. 5 illustrates a set of operations for using a volume selection model to select a volume level in accordance with an embodiment.

FIG. 5 illustrates an example set of operations for using a volume selection model to select a volume level in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, after receiving audio input from a user, a system analyzes the audio input to determine one or more sound characteristics corresponding to the audio input (Operation 502). The sound characteristic(s) may include any characteristic that is relevant to a machine learning feature, as discussed above. Examples of sound characteristics may include, but are not limited to: loudness of a voice (e.g., amplitude of the waveform); properties of a voice indicating whispering, yelling, and/or a hearing impediment; detection of leading and/or trailing echoes; distinguishing between two or more user voices; calculating a signal-to-noise ratio; performing natural language processing to determine linguistic contents of the audio input; ambient noise levels; and/or any other kind of sound characteristic.

In an embodiment, the system may determine one or more non-sound characteristics associated with the audio input (Operation 504). A non-sound characteristic is a characteristic that is relevant to a machine learning feature and that is not discernible from the audio input itself. Examples of non-sound characteristics may include, but are not limited to: a time of day; ambient light; a user's physical location; a kind of device configured to play back an audio response; facial recognition; and/or any other kind of non-sound characteristic. The non-sound characteristics may be considered associated with the audio input due to a proximity in times at which the audio input is received and the non-sound characteristics are determined.

In an embodiment, the system applies the characteristics (i.e., sound characteristics and/or non-sound characteristics) associated with the audio input to a volume selection model (Operation 506). Specifically, one or more characteristics may be used as inputs to a feature-specific function that computes a volume adjustment factor. Based on the volume adjustment factor(s), the volume selection model computes a volume adjustment function to select a volume level based on the characteristics associated with the audio input.

Embodiments described herein allow a virtual assistant to provide audio responses at a volume level that is appropriate for the context in which the response is provided. A system uses machine learning to adapt a volume selection model based on user input, helping to ensure that the selected volume level satisfies the user's preferences and expectations. In environments where a loud response is needed, embodiments help ensure that the user is able to hear the audio response. In environments where a quiet response is needed, embodiments help avoid disruptions that would be caused by an inappropriately loud audio response.

4. Illustrative Example

A detailed example is described below, with reference to FIGS. 6A-6F, for purposes of clarity. Components and/or operations described below should be understood as one specific example which may not be applicable to certain embodiments. Accordingly, components and/or operations described below should not be construed as limiting the scope of any of the claims.

Figure 6A:
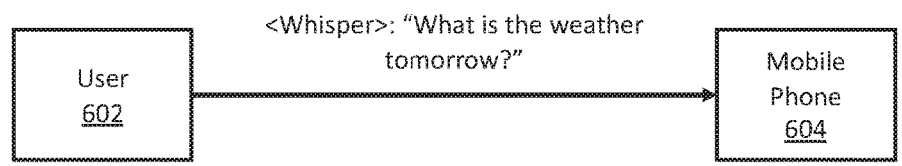
FIGS. 6A-6F illustrate an example in accordance with an embodiment.
Figure 6B:
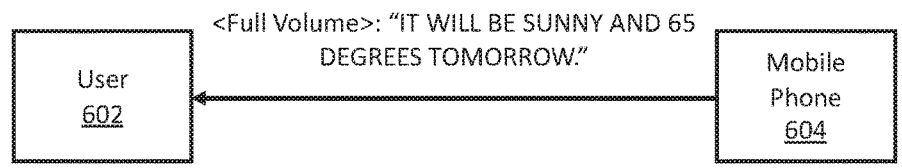
Figure 6C:
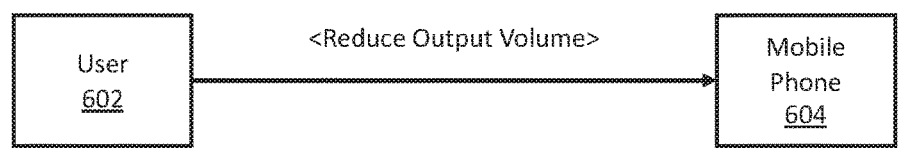

As illustrated in FIG. 6A, a user 602 interacts with a mobile phone 604. The mobile phone 604 includes a virtual assistant that relies on backend functions provided by a server (not shown) communicatively coupled with the mobile phone 604. In this example, the user 602 is a parent putting a baby to bed in a darkened room. The user 602 whispers into the mobile phone 604's microphone, "What is the weather tomorrow?" The virtual assistant processes the user 602's request and generates a response. In addition, the virtual assistant selects a volume level for the response. The selected volume level corresponds to the mobile phone's full volume. In FIG. 6B, the mobile phone 604 plays back the virtual assistant's response at the selected full volume: "IT WILL BE SUNNY AND 65 DEGREES TOMORROW." Given the context (i.e., putting a baby to bed), the user 602 finds the selected volume to be too loud. In FIG. 6C, after hearing the virtual assistant's response, the user 602 reduces the mobile phone 604's master output volume, using a physical volume adjustment control on the mobile phone 604. Based on the user 602 adjusting the mobile phone 604's master output volume, the virtual assistant calibrates the volume selection model. Specifically, the virtual assistant calibrates the volume selection model so that under similar circumstances in the future (e.g., a darkened room and the user whispering), the volume selection model will select a quieter volume.

Figure 6D:
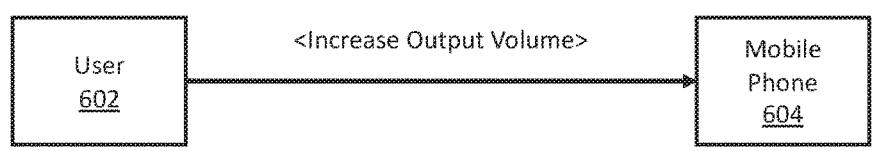
Figure 6E:
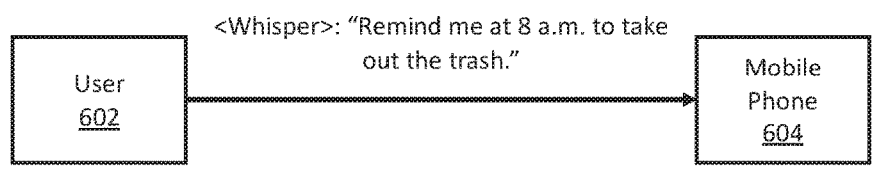
Figure 6F:
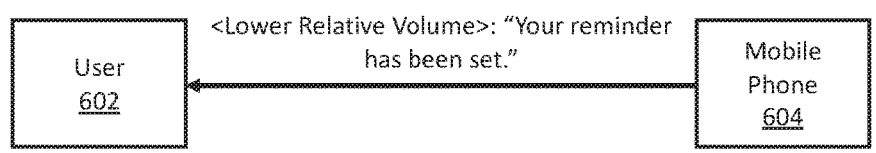

As illustrated in FIG. 6D, the user 602 subsequently increases the mobile phone 604's master output volume. For example, the user 602 may increase the mobile phone 604's master output volume after leaving the baby's room. At a later time, the user 604 returns to the baby's room, e.g. to bring a bottle of milk. In FIG. 6E, the user 602 whispers another request into the mobile phone 604: "Remind me at 8 a.m. to take out the trash." The user 602 has neglected to decrease the mobile phone 604's master output volume. If the mobile phone 604 were to play back a response at the same volume as before, the response would again be too loud. Instead, based on the darkness of the room and the user whispering, the calibrated volume selection model now selects a lower volume level. In FIG. 6F, even though the mobile phone 604's master output volume is high, the mobile phone 604 plays back the response at a relatively lower volume: "Your reminder has been set." The user 602 finds the volume of this subsequent response to be acceptable and does not adjust the mobile device 604's master output volume.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more machine-readable media storing instructions which,
   when executed by one or more processors, cause:
   receiving a first audio input comprising a first request;
   analyzing the first audio input to determine one or more sound characteristics corresponding to the first audio input;
   applying the one or more sound characteristics corresponding to the first audio input to a volume selection model to compute a first volume level;
   playing a first audio response, corresponding to the first request, at the first volume level;
   subsequent to playing the first audio response at the first volume level, receiving a first user input to modify an output volume from the first volume level to a second volume level;
   calibrating the volume selection model, based on the first user input to obtain an updated volume selection model;
   receiving a second audio input comprising a second request;
   analyzing the second audio input to determine one or more sound characteristics corresponding to the second audio input, wherein the one or more sound characteristics corresponding to the second audio input are similar to the one or more sound characteristics corresponding to the first audio input;
   applying the one or more sound characteristics corresponding to the second audio input to the updated volume selection model to compute a third volume level that is similar to the second volume level;
   playing a second audio response, corresponding to the second request, at the third volume level via an audio device;
   subsequent to the second audio response, detecting passage of a threshold period of time without receiving any user input to modify the output volume; and
   based on detecting passage of the threshold period of time without receiving any user input to modify the output volume: affirming, in the volume selection model, that the third volume level is correct for responding to audio input having one or more sound characteristics that are similar to the one or more sound characteristics corresponding to the second audio input.

2. The one or more media of claim 1,
   wherein analyzing the first audio input to determine the one or more sound characteristics corresponding to the first audio input comprises determining that the first audio input comprises a voice of a first user of a plurality of users of the audio device, and
   wherein calibrating the volume selection model is performed for the first user and not for a second user of the plurality of users of the audio device.

3. The one or more media of claim 1, further storing instructions which, when executed by one or more processors, cause:
 subsequent to playing a third audio response at the third volume level, receiving second user input requesting repetition of the third audio response;
 further calibrating the volume selection model, based on the second user input; and
 repeating the third audio response at a fourth volume level that is higher than the third volume level.

4. The one or more media of claim 1, further storing instructions which, when executed by one or more processors, cause:
 generating the volume selection model at least by performing supervised learning based on training data comprising a plurality of prelabeled audio inputs.

5. The one or more media of claim 4, wherein the plurality of prelabeled audio inputs comprises a plurality of audio inputs mapped, respectively, to corresponding predefined volume selections.

6. The one or more media of claim 1, further storing instructions which, when executed by one or more processors, cause:
 training the volume selection model in a dedicated training mode, at least by:
  prompting a user of the audio device to supply a series of training audio inputs; and
  calibrating the volume selection model based on the series of training audio inputs.

7. The one or more media of claim 1, further storing instructions which, when executed by one or more processors, cause:
 transmitting calibration data associated with the volume selection model to a server; and
 incorporating, at the server, the calibration data into a baseline volume selection model distributed to one or more other audio devices.

8. The one or more media of claim 7, wherein the baseline volume selection model is distributed to one or more other audio devices as an out-of-the-box configuration.

9. The one or more media of claim 1, wherein analyzing the first audio input to determine the one or more sound characteristics corresponding to the first audio input comprises determining loudness of a voice in the first audio input.

10. The one or more media of claim 1, wherein analyzing the first audio input to determine the one or more sound characteristics corresponding to the first audio input comprises estimating a distance of a user of the audio device from the audio device.

11. The one or more media of claim 1, wherein analyzing the first audio input to determine the one or more sound characteristics corresponding to the first audio input comprises determining an ambient volume level.

12. The one or more media of claim 1, wherein analyzing the first audio input to determine the one or more sound characteristics corresponding to the first audio input comprises determining that the audio device is of a particular kind of audio device.

13. The one or more media of claim 1, wherein analyzing the first audio input to determine the one or more sound characteristics corresponding to the first audio input comprises calculating a signal to noise ratio in the first audio input.

14. The one or more media of claim 1, wherein analyzing the first audio input to determine the one or more sound characteristics corresponding to the first audio input comprises determining that the first audio input is addressed to a particular virtual assistant persona of a plurality of virtual assistant personas associated with the audio device.

15. The one or more media of claim 1, wherein analyzing the first audio input to determine the one or more sound characteristics corresponding to the first audio input comprises determining that a user of the first audio device has a hearing impairment.

16. The one or more media of claim 1, further storing instructions which, when executed by one or more processors, cause:
 adjusting the third volume level based on one or more non-sound characteristics associated with the second audio input.

17. The one or more media of claim 16, wherein the one or more non-sound characteristics comprise a time of day of the second audio input.

18. The one or more media of claim 16, wherein the one or more non-sound characteristics comprise an ambient light level.

19. The one or more media of claim 1, further storing instructions which, when executed by one or more processors, cause:
 generating the volume selection model at least by performing supervised learning based on training data comprising a plurality of prelabeled audio inputs, wherein the plurality of prelabeled audio inputs comprises a plurality of audio inputs mapped, respectively, to corresponding predefined volume selections;
 training the volume selection model in a dedicated training mode, at least by:
  prompting a user of the audio device to supply a series of audio inputs, and
  calibrating the volume selection model based on the series of audio inputs;
 subsequent to playing a third audio response at the third volume level, receiving second user input requesting repetition of the third audio response;
 further calibrating the volume selection model, based on the second user input;
 repeating the third audio response at a fourth volume level that is higher than the third volume level;
 transmitting calibration data associated with the volume selection model to a server;
 incorporating, at the server, the calibration data into a baseline volume selection model distributed to one or more other audio devices, wherein the baseline volume selection model is distributed to one or more other audio devices as an out-of-the-box configuration;
 adjusting the third volume level based on one or more non-sound characteristics associated with the second audio input, wherein the one or more non-sound characteristics comprise a time of day of the second audio input and an ambient light level,
 wherein analyzing the first audio input to determine the one or more sound characteristics corresponding to the first audio input comprises:
  (a) determining that the first audio input comprises a voice of a first user of a plurality of users of the audio device, wherein calibrating the volume selection model is performed for the first user and not for a second user of the plurality of users of the audio device,
  (b) determining loudness of a voice in the first audio input,
  (c) estimating a distance of a user of the audio device from the audio device, (d) determining an ambient volume level,
(e) determining that the audio device is of a particular kind of audio device,
(f) calculating a signal to noise ratio in the first audio input,
(g) determining that the first audio input is addressed to a particular virtual assistant persona of a plurality of virtual assistant personas associated with the audio device, and
(h) determining that a user of the first audio device has a hearing impairment.

20. The one or more media of claim 1, wherein affirming, in the volume selection model, that the third volume level is correct for responding to audio input having one or more sound characteristics that are similar to the one or more sound characteristics corresponding to the second audio input comprises:
    incorporating into the volume selection model a confidence metric indicating an increased confidence that the third volume level is correct for responding to audio input having one or more sound characteristics that are similar to the one or more sound characteristics corresponding to the second audio input.

21. A method comprising:
    receiving a first audio input comprising a first request;
    analyzing the first audio input to determine one or more sound characteristics corresponding to the first audio input;
    applying the one or more sound characteristics corresponding to the first audio input to a volume selection model to compute a first volume level;
    playing a first audio response, corresponding to the first request, at the first volume level;
    subsequent to playing the first audio response at the first volume level, receiving a first user input to modify an output volume from the first volume level to a second volume level;
    calibrating the volume selection model, based on the first user input to obtain an updated volume selection model;
    receiving a second audio input comprising a second request;
    analyzing the second audio input to determine one or more sound characteristics corresponding to the second audio input, wherein the one or more sound characteristics corresponding to the second audio input are similar to the one or more sound characteristics corresponding to the first audio input;
    applying the one or more sound characteristics corresponding to the second audio input to the updated volume selection model to compute a third volume level that is similar to the second volume level;
    playing a second audio response, corresponding to the second request, at the third volume level via an audio device;
    subsequent to the second audio response, detecting passage of a threshold period of time without receiving any user input to modify the output volume; and
    based on detecting passage of the threshold period of time without receiving any user input to modify the output volume: affirming, in the volume selection model, that the third volume level is correct for responding to audio input having one or more sound characteristics that are similar to the one or more sound characteristics corresponding to the second audio input,
    wherein the method is performed by at least one device including a hardware processor.

* * * * *